United States Patent
Pallawela

(10) Patent No.: US 11,316,220 B2
(45) Date of Patent: Apr. 26, 2022

(54) ALKALI POLYSULPHIDE FLOW BATTERY

(71) Applicant: Pasidu Mihikara Pallawela, Midlothian (GB)

(72) Inventor: Pasidu Mihikara Pallawela, Midlothian (GB)

(73) Assignee: StorTera Ltd., Edinburgh (GB)

( * ) Notice: Subject to any disclaimer, the term of this patent is extended or adjusted under 35 U.S.C. 154(b) by 155 days.

(21) Appl. No.: 16/782,168

(22) Filed: Feb. 5, 2020

(65) Prior Publication Data
US 2021/0242519 A1    Aug. 5, 2021

(51) Int. Cl.
| | |
|---|---|
| *H01M 12/08* | (2006.01) |
| *H01M 4/38* | (2006.01) |
| *H01M 4/40* | (2006.01) |
| *H01M 8/0234* | (2016.01) |
| *H01M 8/18* | (2006.01) |

(52) U.S. Cl.
CPC ......... *H01M 12/08* (2013.01); *H01M 4/382* (2013.01); *H01M 4/40* (2013.01); *H01M 8/0234* (2013.01); *H01M 8/188* (2013.01); *H01M 2300/0071* (2013.01); *H01M 2300/0082* (2013.01)

(58) Field of Classification Search
CPC .................................................. H01M 8/188
See application file for complete search history.

(56) References Cited

U.S. PATENT DOCUMENTS

| | | | |
|---|---|---|---|
| 8,889,300 B2 | 11/2014 | Bugga et al. | |
| 2014/0302370 A1* | 10/2014 | Woodford | H01M 8/188 429/101 |
| 2015/0255803 A1* | 9/2015 | Delnick | H01M 8/188 429/498 |

OTHER PUBLICATIONS

Journal of Power Sources, vol. 301, R. Song et al, "A trilayer separator with dual function for high performance lithium-sulfur batteries", pp. 179-186.
Ionics, vol. 24, No. 4, 2015, Q. Xu et al., "A trialyer carbon nanotube/Al2O3/polypropylene separator for lithium-sulfur batteries", pp. 981-986.
Inorganic Chemistry Frontiers, vol. 4, No. 6, M. Raja et al., "high performance multi-functional trilayer membranes as perselective separators for lithium-sulfur batterie", pp. 1013-1021.

* cited by examiner

*Primary Examiner* — Brian R Ohara
(74) *Attorney, Agent, or Firm* — Blue Filament Law PLLC

(57) ABSTRACT

An alkali polysulphide flow battery, components, systems and compositions for use with an alkali polysulphide flow battery and a method of manufacturing and operating a flow battery system are provided. An ion-selective separator composition for a battery having an anode and an alkali metal sulfide or polysulfide cathode is provided. The separator composition includes an alkali metal ion conducting separator film for separating the anode and the cathode, a carbon layer disposed to a cathode side of the film and an alkali metal ion conductor layer disposed to an anode side of the carbon layer.

19 Claims, 5 Drawing Sheets

ALKALI POLYSULPHIDE FLOW BATTERY

BACKGROUND OF THE INVENTION

In balancing intermittent supplies of power, such as available from renewable energy systems, with variable demand, means of energy storage that provide availability for storage and recovery of energy are desirable. In particular, power storage options that are capable of rapid charge and discharge on demand and multiple cycling are advantageous. Whilst pumped hydro offers a large-scale energy storage option and hydrogen is a useful energy storage and transport medium, for rapid cycling of power and charge and discharge on demand, supercapacitors and batteries are possible options. Flow batteries are recognised as high capacity stationary power storage and cycling system.

A flow battery typically comprises an electrochemical cell and has at least one liquid electrolyte and more usually two liquid electrolytes. Typically, the electrolyte flows through an electrochemical cell from an electrolyte reservoir and is charged or discharged at an electrode. A charge carrier species typically passes through a charge-carrier porous membrane separating the catholyte and anolyte. Flow batteries, whilst offering the potential for large scale energy storage have typically suffered from certain disadvantages including energy density, cycling issues and corrosive material issues.

Various types of flow battery are available. A particularly interesting form of flow battery that has the potential to address some of the shortcomings of flow batteries are lithium-polysulphide systems.

Lithium polysulfide systems are known for use in flow batteries and solid state batteries alike, in which lithium ions are the charge carriers. In a lithium polysulfide system, in the course of discharge, the lithium polysulfide converts from a polysulfide species ($Li_2S_8$) to, potentially, a highly lithiated lithium sulphide species ($Li_2S$), via a number of lithium sulphide intermediates, $Li_2S_6$, $Li_2S_4$, $Li_2S_3$ and $Li_2S_2$. The more highly lithiated species offer the greatest charge carrying capacity (and their use thereby substantially improves power density of the battery), but also suffer from being highly insoluble species (compared with the less highly lithiated species). A second issue with such lithium polysulfide systems is the issue of polysulfide shuttle whereby polysulfide species manage to pass the separator or membrane to contaminate the lithium anode or anolyte.

U.S. Pat. No. 8,889,300 (Bugga et al) is concerned with a high energy density flow battery comprising an anode of a lithium solvated electron solution (Li-SES) anolyte or a solid lithium anode and a cathode of a Li-SES catholyte or a lithium polysulfide solution catholyte, the cathode and anode separated by a lithium ion conductive membrane. According to U.S. Pat. No. 8,889,300, on charging of the flow battery, the lithium polysulfide is de-lithiated through to a $S_8$ species and on discharge, the $S_8$ associates with lithium ions to form successive lithiated species $Li_2S_8$, $Li_2S_6$, $Li_2S_4$ and $Li_2S_3$. It states that the catholyte conductive solution includes lithium polysulfides in the form of $Li_xS_n$ where n is from 3 to 8, because $Li_2S_2$ and $Li_2S$ species are insoluble. Thus, the U.S. Pat. No. 8,889,300 system does not utilise the highly lithiated lithium sulfide species.

The present inventor has invented a new and improved battery system and flow battery.

Problem to be Solved by the Invention

There is a need for improvements in flow batteries and lithium sulfide batteries.

It is an object of this invention to provide a flow battery and/or an alkali (especially lithium) sulfide battery with improved performance characteristics, especially improved energy density.

SUMMARY OF THE INVENTION

In accordance with a first aspect of the invention, there is provided an ion-selective separator composition for a battery having an anode and an alkali metal sulfide or polysulfide cathode, the separator composition comprising an alkali metal ion conducting separator film for separating the anode and the cathode, a carbon layer disposed to a cathode side of the film and an alkali metal ion conductor layer disposed to an anode side of the carbon layer.

In a second aspect of the invention, there is provided an alkali metal ion flow battery comprising:

a flow battery electrochemical cell comprising an anode half-cell and a cathode half-cell separated by an ion-selective separator, the electrochemical cell having at least one liquid electrode or electrolyte;

at least one electrolyte reservoir and a flow circulation system for facilitating flow of electrolyte to and from the electrochemical cell and electrolyte reservoir; and optionally a power convertor for two way conversion of current to and from the electrochemical cell and a load or supply, wherein the flow battery further comprises one or more of:
a) an ion-selective separator comprising an ion-selective separator composition as defined above;
b) an alkali-metal polysulfide catholyte
c) an anode selected from a solid alkali metal, alkali metal alloy, alkali metal composition and an alkali-metal based anolyte;
d) an electrolyte flushing system for flushing an electrolyte through the electrochemical cell in a short burst or pulse;
e) a flow circulation system for facilitating flow of electrolyte which is configured to enable the circulating electrolyte to pass through the power convertor to act as a coolant for the power convertor; and
f) a dosing and/or filtering system for use with the at least one electrolyte.

In a third aspect of the invention, there is provided an alkali-metal polysulfide catholyte for use in a flow battery as defined above.

In a fourth aspect of the invention, there is provided an anode for use in a flow battery as defined above, the anode being selected from a solid alkali metal, alkali metal alloy, alkali metal composition and an alkali-metal based anolyte.

In a fifth aspect of the invention, there is provided an electrolyte flushing system for use in a flow battery as defined above, the electrolyte flushing system being for flushing an electrolyte through an electrochemical cell in a short burst or pulse.

In a sixth aspect of the invention, there is provided a flow circulation system for facilitating flow of electrolyte which is configured to enable the circulating electrolyte to pass through a power convertor to act as a coolant for the power convertor.

In a seventh aspect of the invention, there is provided a dosing and/or filtering system for use with at least one electrolyte in a flow battery as defined above.

In an eighth aspect of the invention, there is provided an electrochemical cell for a flow battery as defined above, the electrochemical cell comprising an anode half-cell and a cathode half-cell separated by an ion-selective separator and having at least one liquid electrode or electrolyte.

In a ninth aspect of the invention, there is provided a method of operating an alkali metal ion flow battery as defined above, the method comprising, during the discharge cycle, periodically drawing a high current for a short period (e.g. of up to 10 ms) and detecting the voltage variation during that period and, in dependence of no or minimal drop in voltage, causing the positive electrolyte to be circulated at a higher flow rate for a predetermined duration (e.g. 5 s).

In a tenth aspect of the invention, there is provided a method of enhancing performance of an electrolyte in a flow battery, the method comprising dosing the electrolyte with a functional additive.

Advantages of the Invention

The invention provides an ion-selective separator composition for a battery and an alkali metal ion flow battery which has improved performance over existing systems in terms of energy density whilst inhibiting the problem of polysulfide shuttle suffered by conventional lithium polysulfide batteries, thereby improving cycle efficiency and charge/discharge efficiency and doing so in a cost-effective manner.

DETAILED DESCRIPTION OF THE INVENTION

Figure 1:
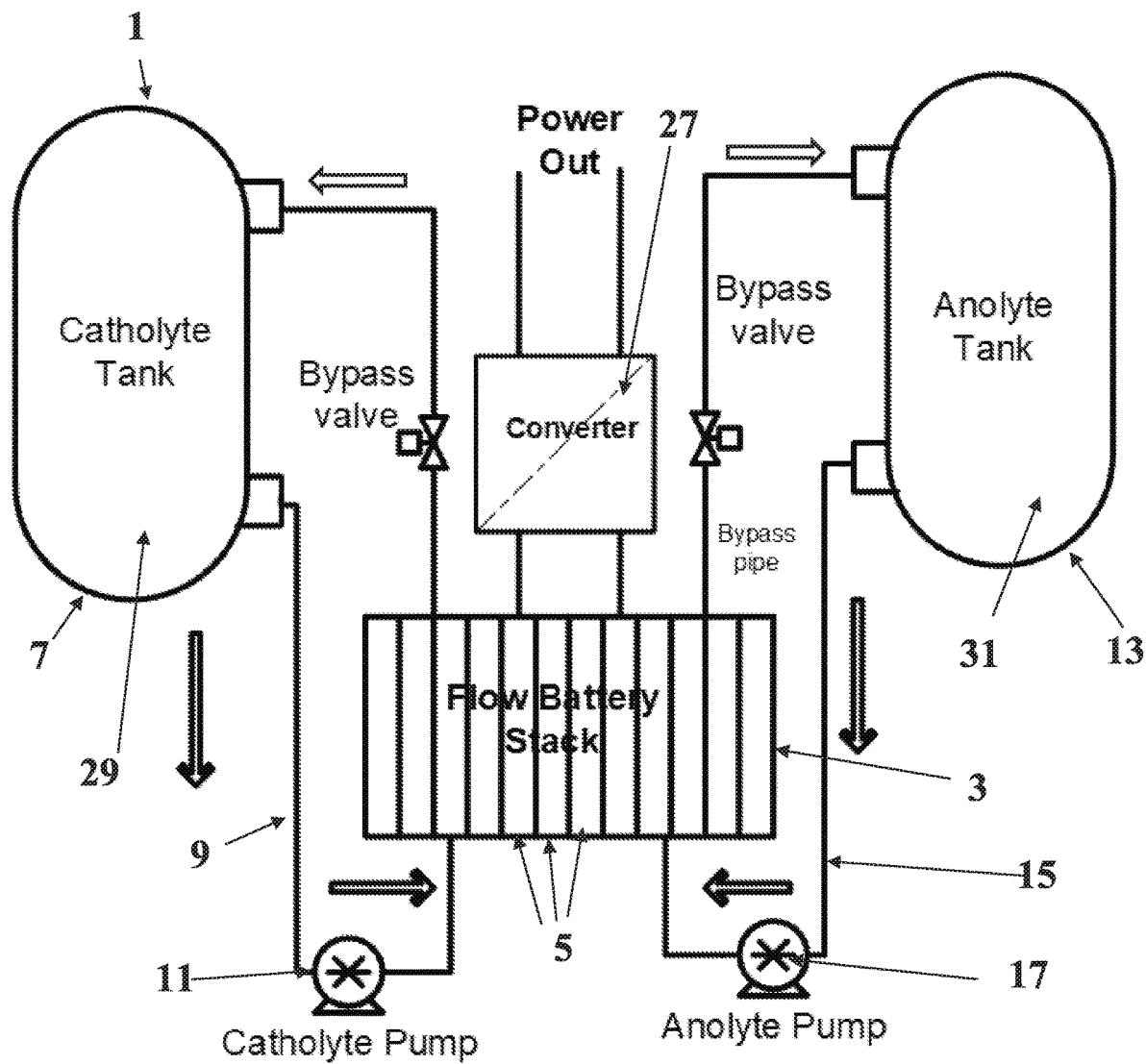
FIG. 1 is a diagrammatic representation of a flow battery according to one embodiment of an aspect of the invention having an anolyte and a catholyte.

The invention provides for an improved battery and improved flow battery and components thereof.

Preferably, the battery is a flow battery.

The term 'flow battery' as used herein may refer to a conventional dual liquid flow battery or a hybrid single liquid flow battery. A conventional dual liquid flow battery is one where the cathode (catholyte) and anode (anolyte) are both liquids. A hybrid single liquid flow battery is a battery where there is a liquid electrode on one side of the cell (typically the cathode, forming a catholyte) and a solid electrode on the other side of the cell.

As used herein, the term anode is the negative electrode and the term anolyte is an electrolyte in or circulating through the anode or negative half cell of an electrochemical cell. The term cathode is the positive electrode and the term catholyte is an electrolyte in or circulating through the cathode half cell of an electrochemical cell.

The flow battery according to the present invention is an alkali metal ion flow battery having a flow battery electrochemical cell. The electrochemical cell has an anode half-cell and a cathode half-cell separated by an ion-selective separator and has at least one liquid electrode or electrolyte.

The flow battery will have at least one electrolyte reservoir and a flow circulation system (typically comprising conduits connecting the electrochemical cell or a plurality of electrochemical cells in a cell stack with the electrolyte storage reservoir and a pump or other means for causing the electrolyte to circulate therethrough as required). The flow battery will typically further comprise or be associated with a power convertor for two-way conversion of current to and from the electrochemical cell with a load or supply (e.g. from a/c to d/c). The flow battery further comprises one or more and preferably all of the following features, which are preferred features of the flow battery of the invention and independently further aspects of invention:

a) an ion-selective separator comprising an ion-selective separator composition;
b) an alkali-metal polysulfide catholyte
c) an anode selected from a solid alkali metal, alkali metal alloy, alkali metal composition, an intercalated alkali metal host composition and an alkali-metal based anolyte;
d) an electrolyte flushing system for flushing an electrolyte through the electrochemical cell in a short burst or pulse;
e) a flow circulation system for facilitating flow of electrolyte which is configured to enable the circulating electrolyte to pass through the power convertor to act as a coolant for the power convertor; and
f) a dosing and/or filtering system for use with the at least one electrolyte.

In a preferred embodiment, the flow battery is a lithium ion flow battery and preferably comprises a lithium polysulfide catholyte as the positive electrode or cathode and as the negative electrode or anode there is optionally a solid lithium-based anode, an intercalated lithium and solid composite host material or a solvated lithium-based anolyte. Therefore, in a preferred flow battery of the invention lithium or lithium ions are the charge carrying species which are conducted across a separator membrane between the anode half-cell and cathode half-cell during charge/discharge cycles. Typically, current collectors are provided in relation to each of the cathode or anode, especially where a liquid cathode or anode is provided. Whilst a lithium-based system is preferred, there will be described hereinafter systems related to an alkali metal ion flow battery and to a lithium flow battery, where the alkali metal and lithium may be read interchangeably where the context allow, but the preferred system is where the alkali metal is lithium.

In a preferred embodiment of the flow battery of the invention and in a further aspect, there is an ion-selective separator composition for a battery having an anode and an alkali metal sulfide or polysulfide cathode or catholyte. The separator composition comprises an alkali metal ion conducting separator film for separating the anode and the cathode, a carbon layer disposed to a cathode side of the film and an alkali metal ion conductor layer disposed to an anode side of the carbon layer.

Preferably, the catholyte comprises a carrier medium in which alkali metal polysulfide species are soluble.

Preferably, the alkali metal is lithium and the cathode is a lithium polysulfide catholyte. Lithium polysulfide batteries and flow batteries are known, but suffer from polysulfide shuttle where polysulfide species cross over from the cathode side of an electrochemical cell to the anode side which has the effect of degrading the anode and decreasing the capacity of the catholyte. The structure and composition of the ion-selective separator (preferably a lithium-ion selective separator) is such as to reduce and inhibit polysulfide shuttle.

The ion-selective separator, which is preferably a lithium ion selective separator, comprises an alkali metal ion conducting separator film which functions to conduct the alkali metal ion which will typically be the charge carrier for a battery or system between the anode and cathode sides of a cell during charge and discharge cycles. The alkali metal ion conducting separator film, or membrane, may be suitable ceramics, glasses, polymers gels or combinations thereof, such as an organic polymer, an oxide glass, an oxynitride glass, a sulfide glass, an oxysulfide glass, a crystalline ceramic electrolyte, a perovskite, a nasicon type phosphate, a lisicon type oxide, a metal halide, a metal nitride, a metal phosphide, a metal sulfide, a metal sulfate, a silicate, an aluminosilicate or a boron phosphate. Preferably, the ion conductive film is a polymer film, which is preferably a polyethylene oxide based polymer, a polystyrene, polyethylene or polysulfone or polypropylene optionally having pendant moieties such as crown ethers (e.g. 12-crown-4-ether) and more preferably the ion conductive film is a polypropylene film. This may be of any suitable thickness but preferably has a thickness of up to 250 μm, more preferably up to 100 μm, still more preferably up to 75 μm and most preferably up to 50 μm. It should ideally have a thickness sufficient to maintain integrity, optionally with the support of one or more coatings, but in any case, preferably a thickness of at least 5 μm, more preferably at least 10 μm. Optionally, a polypropylene lithium ion selective film has a thickness in the range of 15 to 40 μm, more preferably 25 to 30 μm. The polypropylene film for use in the separator is typically referred to as a porous or lithium ion selective conducting film.

Disposed to the cathode side of the film is a carbon layer, optionally a composite carbon and polymer (e.g. polyvinylidene fluoride) layer. Preferably, the carbon-containing layer is obtainable by coating a composition of carbon powder, polyvinylidene fluoride and N-methyl-2-pyrrolidinone to what will be the cathode side of the ion-selective film and preferably directly on to the ion conducting separator film. The carbon layer preferably has a thickness of up to 50 μm, more preferably up to 25 μm, still more preferably up to 20 μm, still more preferably up to 15 μm and most preferably up to 10 μm. Preferably, it has a thickness of at least 0.1 μm, more preferably at least 0.5 μm, still more preferably 0.75 μm and most preferably at least 1 μm. Optionally the carbon layer may have a thickness of from 2 to 10 μm, e.g. 5 to 7.5 μm. Preferably, the carbon layer is loaded in an amount of 0.01 mg/cm$^2$ to 1 g/cm$^2$ of the alkali metal ion conducting separator film.

The function of the carbon layer is preferably in weakening the polysulphide shuttle effect. It is intended to inhibit sulphur species from the cathode/catholyte (e.g. $S_8$, $S_6$, etc.) crossing over to anode or the anolyte side. It is believed that the carbon layer is effective by activating the polysulphide species, so they will react with alkali metal ions (typically lithium ions) in the catholyte solution (on the polysulphide side of the separator) and become lithiated rather than shuttling towards the anode.

A carbon powder-containing layer is preferably obtainable by coating a composition of carbon powder, polyvinylidene fluoride and N-methyl-2-pyrrolidinone onto a substrate (e.g. a polypropylene metal ion conducting separator film).

Optionally, the carbon layer is coated directly on to the cathode side of the alkali metal ion conducting separator film or is separated from the film by one or more further layers.

Preferably, the ion-selective separator composition comprises an alkali metal ion conductor layer disposed to an anode side of the carbon layer, which may optionally be disposed to the anode side of the ion-conducting separator film or may be disposed to the cathode side of the ion-conducting separator film (i.e. between the separator film and the carbon layer) or both. Preferably, the alkali metal ion conductor layer comprises aluminium oxide. The aluminium oxide forming the ion conductor layer is believed to be effective in conducting alkali ions (preferably lithium ions) across the membrane or separator, thus improving the charge/discharge efficiency, whilst not facilitating transfer of other species. The aluminium oxide-containing layer is preferably provided in a layer thickness of from 0.5 μm to 100 μm, more preferably 1 μm to 50 μm, e.g. 10 μm to 35 μm.

Preferably, the alkali metal ion conductor layer further comprises titanium oxide, which may form a layer on and/or potentially melded with or within the aluminium oxide-containing layer. Preferably, the titanium oxide-containing layer is provided in a layer thickness of from 0.5 μm to 100 μm, more preferably 1 μm to 50 μm, e.g. 10 μm to 35 μm. The titanium oxide is, it is believed, effective in inhibiting alkali metal ion (e.g. lithium) polysulfide species from passing through the alkali metal ion conductor layer (and on through the ion selective separator to the anode side). The titanium oxide is particularly effective when used with an aluminium oxide layer for a lithium polysulfide catholyte, in which case it is believed that the titanium oxide is a lithium polysulfide gap filler.

In a preferred embodiment of the flow battery of the invention and in a further aspect, there is an alkali-metal polysulfide catholyte. The catholyte is preferably lithium polysulfide. The catholyte used in the flow battery of a preferred embodiment utilizes lithium sulfide species of $Li_2S_n$ (where n=1 to 8) which provides a significantly increased charge/discharge capacity for the catholyte since the discharge capacity in moving from $Li_2S_3$ to $Li_2S$ through $Li_2S_2$ is a significant increase over the $S_8$ to $S_3$ species. More highly lithiated species, such as $Li_2S_2$ and $Li_2S$ are understood to be considerably less soluble in carrier media and so the choice of media, choice of additives and system or flow battery structure or components may be selected to enhance or maximize solubility or stability of highly lithiated polysulfide species in the carrier medium and/or to inhibit precipitation and/or mitigate the effects of precipitation of highly lithiated polysulfide species in the catholyte.

The alkali metal polysulfide or lithium polysulfide catholyte preferably comprises a fluid (preferably liquid) carrier medium which is preferably any suitable medium capable of solvating or dissolving one or more lithium polysulfide species. Suitable such carrier media include, for example one or a mixture of two or more of tetrahydrofuran, dimethyl sulfoxide, dimethyl formamide, 1,3-dioxolane, dimethyl acetamide and tetra(ethylene glycol) dimethyl ether and tetraethylene glycol dimethyl ether-lithium trifluoromethanesulfonate. Preferably, the liquid carrier medium comprises tetra(ethylene glycol) dimethyl ether and dimethyl sulfoxide. Preferably, the tetra(ethylene glycol) dimethyl ether is present in an amount of 50% to 95% by volume of the liquid carrier medium and dimethyl sulfoxide is present in an amount of 5% to 50% by volume of the liquid carrier medium. Optionally, the liquid carrier medium further comprises 1,3-dioxolane, which is preferably present in an amount of up to 15% by volume of the liquid carrier medium, preferably from 2% to 10% by volume (e.g. about 5%). In a particularly preferred embodiment, a liquid carrier medium comprises tetra(ethylene glycol) dimethyl ether, dimethyl sulfoxide and 1,3-dioxolane in the by volume proportions of 55% to 80% tetra(ethylene glycol) dimethyl ether, 15% to 35% dimethyl sulfoxide and about 5% (or e.g. from 3%) to about 10% (or e.g. to 12%) 1,3-dioxolane. Two particularly preferred solvent formulations are: 5% 1,3-dioxolane, 15-25% dimethyl sulfoxide and 70-80% tetra (ethylene glycol) dimethyl ether; and 10% 1,3-dioxolane, 25-35% dimethyl sulfoxide and 55-65% tetra(ethylene glycol) dimethyl ether.

A liquid carrier medium or solvent for the catholyte should preferably have a flash point of at least 125° C., more preferably 150° C. (to enable a reasonable working temperature for the cell) and still more preferably at lease 180° C. and should preferably have a melting point not higher than 0° C., more preferably not higher than −5° C.

Preferably, the alkali metal ion polysulfide catholyte (e.g. a lithium polysulfide catholyte) in a carrier medium further comprises an alkali metal ion polysulfide species solvating additive, which is preferably capable of solvating the more highly lithiated species such as $Li_2S_2$ and $Li_2S$. Preferably, the catholyte comprises a phosphorus pentasulfide, preferably in an amount of up to 20% by weight of polysulfide in the catholyte, more preferably up to 15%, still more preferably up to 10% and yet more preferably up to 5% and preferably at least 1%, more preferably at least 2% and still more preferably at least 4%.

Optionally, the catholyte further comprises an alkali metal nitrate, such as lithium nitrate. The effect of the lithium nitrate, it is believed, is at the ion selective separator or membrane where it inhibits the formation of lithium polysulfide in or close to the anode. The alkali metal nitrate may be provided in an amount of up to 5% by weight of polysulfide in the catholyte.

The concentration of the catholyte is preferably as high as operably practicable since a higher concentration corresponds with a higher charge density. The concentration achievable may depend upon the solvent system chosen and the solubility of the polysulfide species in that solvent system. In one embodiment in which the solvent is an organic polar solvent, such as tetrahydrofuran, the concentration of polysulfide in the catholyte, based upon moles of sulfur, may be up to 12 M, e.g. from 8 to 10 M. In another embodiment in which the solvent is glycol based (e.g. a mixture of tetra(ethylene glycol) dimethyl ether, dimethyl sulfoxide and optionally 1,3-dioxolane), the concentration of polysulfide in the catholyte, based upon moles of sulfur, may be up to 8M, e.g. from 4 to 6 M, preferably about 5 M.

A cathode half-cell should further be provided with a current collector. Any suitable current collector may be used, e.g. aluminium, steel or carbon. Preferably, the cathode current collector is an aluminium foil and more preferably is an aluminium foil coated with a carbon coating (e.g. carbon black or graphite).

The flow battery of the present invention may comprise an anode which is a solid alkali metal, a solid alkali metal alloy, a solid alkali metal composition or an alkali metal-based anolyte. Preferably, in each case, the alkali metal is lithium.

In one embodiment, in which the anode is a solid electrode and in which the battery is thereby a single electrolyte or hybrid flow battery, the anode may be a pure metal anode, an alloy anode or an alkali metal composition or an alkali metal intercalation host material. The intercalation host material may be selected from carbon, silicon, tin and cobalt tin titanium. Preferably, the intercalation material is graphite and more preferably, the anode is lithium intercalated in graphite.

A preferred lithium intercalation host material for use in the anode half-cell (e.g. as the anode) is also provided as another aspect of the invention. According to this aspect and preferred embodiment, a lithium intercalation host material of graphite is provided, which preferably comprises layer coated onto a substrate (typically a current collector of stainless steel or other suitable material) a layer of graphite typically up to 200 µm, more preferably up to 100 µm and more preferably from 25 to 75 µm (e.g. about 50 µm) thick. The graphite layer preferably comprises graphite particles (of less than 20 µm, more preferably less than 10 µm) and a binder which is preferably an alkaline binder. Preferably, the binder comprises a cellulose and/or an acrylic acid and more preferably a carboxymethyl cellulose preferably with a polyacrylic acid, preferably in a ratio of from 1:4 to 1:1 more preferably from 1:3 to 1:1.5 and most preferably in a ratio of 1:2. The graphite layer preferably further comprises graphene nano platelets (e.g. in an amount up to 10% by weight) and/or a conductive additive super C65 (e.g. available from TIMCAL as Super C65 and e.g. in an amount of up to 5% by weight). Preferably, the graphite layer comprises up to 20 wt % of the binder, more preferably up to 15 wt %, still more preferably at least 2 wt % and most preferably from 4 to 8 wt %, e.g. 5 to 7 wt %. Preferably, the graphite coating material is obtainable by ball milling a coarse graphite powder (with particle size from 10 to 20 µm) in an amount of at least 50% by weight, more preferably at least 70% optionally with a fine graphite powder (with particle size from 5 to 10 µm), with optional graphene nano platelet and conductive additive carbon black along with the above binder composition in aqueous solution of at least 20 wt % water (e.g. sodium carboxymethyl cellulose, 20% by weight, and sodium polyacrylic acid, 40% by weight, and water, 40% by weight). The slurry is preferably ball milled for up to 10 hours, preferably from 4 to 6 hours. After coating onto a substrate (e.g. stainless steel foil, as a current collector), such as by blade coating or blade casting, the graphite layer-coated foil is dried (e.g. under vacuum at up to 95° C., preferably about 90° C. for at least 6 hours, e.g. up to 24 hours and preferably from 10 to 14 hours). The resulting anode is effective in intercalating lithium and is capable of withstanding contact with glycol-based catholyte solvents and, in particular, a solvent comprising a mixture of tetra(ethylene glycol) dimethyl ether, dimethyl sulfoxide and optionally 1,3-dioxolane.

In another embodiment, in which the anode comprises a liquid anolyte, typically an alkali metal-based anolyte such as a lithium anolyte, the battery is a double electrolyte flow battery. The anolyte preferably comprises an alkali-metal polyaromatic hydrocarbon complex in a liquid carrier medium. The polyaromatic hydrocarbon is preferably selected from one or a mixture of by phenyl and naphthalene, which form a solvated electron solution with lithium in a solvent or carrier medium which is preferably tetrahydrofuran. Optionally, the anolyte comprises an alkali metal nitrate.

An anode half-cell should further be provided with a current collector. Any suitable current collector may be used. Preferably, the current collector is steel and more preferably stainless steel, such as a stainless steel foil of up to 200 µm thickness, more preferably from 50 to 150 µm, still more preferably from 80 to 120 µm such as about 100 µm thickness.

In another preferred embodiment of the flow battery of the invention, there further comprises an electrolyte flushing system for flushing an electrolyte through the electrochemical cell in a short burst or pulse. Such a system finds particular application when configured for use with a lithium polysulfide catholyte to inhibit precipitation of highly lithiated lithium polysulfide species (such as $Li_2S_2$ or $Li_2S$) in the electrochemical cell during a discharge cycle. Preferably, the electrolyte flushing system is configured to cause electrolyte to be circulated at an increased flow rate for a pre-determined or determined duration in dependence of a pre-defined trigger. The pre-defined trigger may comprise a determination of a change in voltage in response to an active change in current. Preferably, the electrolyte flushing system is configured to cause electrolyte to be circulated at an increased flow rate for a pre-determined or determined duration in dependence of a pre-defined trigger which trigger is the detection of no or minimal reduction in voltage in response to a high current draw test, which may comprise drawing a high current (e.g. at least 25% more than actually being drawn during the discharge to meet a demand and no more than say 100% more, e.g. up to 80% more and more preferably up to about 60% more, typically 50% more) for a period of up to 500 ms (milliseconds), more preferably up to 100 ms, still more preferably up to 50 ms, still more preferably up to 25 ms and most preferably up to 20 ms. The current draw is ideally for at least 1 ms and still more preferably at least 5 ms.

Optionally, the pre-defined trigger may identify the point during a discharge cycle when a flushing procedure (comprising periodic or occasional flushing) should begin or may trigger an instance of flushing.

Preferably, the electrolyte flushing system is configured to cause electrolyte to be circulated at an increased flow rate for up to 5 minutes, more preferably up to 1 minutes, still more preferably up to 30 seconds, more preferably up to 20 seconds and most preferably up to 10 seconds. Preferably, the electrolyte is circulated at an increased flow rate of at least 1 second, more preferably at least 5 seconds.

The flushing system may be configured to circulate fluid at a rate that is increased upon the necessary circulation for the particular point of discharge (e.g. up to 200% increase, more preferably up to 100% increase and preferably at least 10% increase and still more preferably at least 20% increase and optimally from 30 to 75% increase, e.g. from 40 to 60% increase). Optionally, the flushing (or the pre-defined trigger test) can be carried out at predefined intervals of power discharge (rather than intervals of time) and optionally decreasing power discharge intervals, for example every 250 Wh or up to every 200 Wh, preferably up to every 150 Wh, still more preferably up to every 120 Wh, preferably at least every 50 Wh and most preferably up to every 100 Wh's discharged per cell in the flow battery system. Optionally, the flushing may take place at an increased rate at greater depth of discharge. The flushing is ideally only activated when likelihood of highly lithiated species is great, such as during discharge and toward the tail end of the depth of discharge (DOD), e.g. from at least 70% DOD, more preferably at least 75% DOD, still more preferably at least 80% and yet more preferably from 80-95% DOD.

The flushing system finds particular application in combination with an alkali metal ion polysulfide (e.g. lithium polysulfide) catholyte having a polysulfide solvating agent (e.g. $P_2S_5$).

In another preferred embodiment of the flow battery of the invention, there is a flow circulation system for facilitating flow of electrolyte which is configured to enable the circulating electrolyte to pass through the power convertor to act as a coolant for the power convertor.

In another preferred embodiment of the flow battery of the invention, there is a dosing and/or filtering system for use with the at least one electrolyte. This is preferably configured to dose the at least one electrolyte with a functional additive, ideally after pre-determined periods of time, after a pre-determined number of charge-discharge cycles or a pre-determined number of charge-discharge cycles over a pre-determined depth of discharge, in response to a performance measurement outside a pre-determined range and/or to maintain the concentration of the functional additive in the electrolyte within a pre-determined range. In a preferred embodiment, the electrolyte is an alkali metal polysulfide catholyte and the functional additive is selected from a highly alkaliated alkali metal polysulfide species solvating agent and an alkali metal nitrate. The solvating agent may be phosphorus pentasulfide which is dosed into the catholyte to maintain the concentration thereof within the range 0.5% to 5%, preferably 0.75% to 1%, by weight of polysulfide in the catholyte.

In another embodiment of the dosing system, the electrolyte is an alkali metal solvated electronic solution and the functional additive is an alkali metal nitrate, preferably when the alkali metal solvated electronic solution has a lithium ion concentration of greater than 10 molar.

Optionally, there is provided an electrolyte filtering system for periodically removing precipitated material from the at least one electrolyte. This may be configured to remove precipitated material from electrolyte in the electrolyte storage reservoir, such as the base or sump thereof, by for example circulating electrolyte from the storage reservoir through an electrolyte filtration circuit.

In a further aspect, a flow battery having a circulating electrolyte and a power convertor is configured to enable the circulating electrolyte to pass through the power convertor to act as a coolant for the power convertor.

In a further aspect, there is provided an electrochemical cell for use in a flow battery as defined above, which cell comprises an anode half-cell and a cathode half-cell. It is preferably separated by an ion-selective separator and having at least one liquid electrode or electrolyte. The electrochemical cell and/or ion-selective separator may be as further defined above. Preferably in an electrochemical cell, each cell half configured for operating with an electrolyte (e.g. a hybrid or single electrolyte battery or conventional or dual electrolyte battery) is provided with a current collector. The current collector may be of any suitable material as is known in the art or as defined above.

In a preferred embodiment of the invention, a flow battery or electrochemical cell of a flow battery comprises an anode half-cell comprising a lithium intercalated graphite host anode (preferably as defined above) and a cathode half-cell comprising a lithium polysulfide catholyte which is configured to circulate via a flow circulation system to and from a catholyte storage reservoir. The cell halves are preferably separated by an ion selective separator composition (preferably as defined above), preferably comprising a lithium conducting separator film (such as a microporous polypropylene), a graphene layer on the cathode side of the film and an aluminium nitrate coating on the anode side of the film. The catholyte carrier medium is preferably a glycol-based medium comprising TEGDME and optionally one or both of DMSO and 1,3-dioxolane (preferably as defined above) and preferably with phosphorus pentasulfide additive. The system is preferably configured with a pulse-flushing system for use at high depth of discharge to circulate the catholyte. The charge-discharge cycle is preferably controlled by a control system to allow formation of highly lithiated sulfide species including $Li_2S_2$ and $Li_2S$ in order to increase the discharge capacity of the cell. As such, according to a preferred embodiment the flow battery and electrochemical cell are capable of providing a discharge capacity of at least 250 mAh/g of sulfur and more preferably at least 275 mAh/g of sulfur, still more preferably at least 300 mAh/g of sulfur, still more preferably at least 315 mAh/g of sulfur. Preferably this is achieved even when allowing up to 95% depth of discharge of the cell. Preferably, the cell and flow battery according to this preferred embodiment can provide stable multiple cycling of charge-discharge cycles and preferably at least 1000 cycles, more preferably at least 2000, still more preferably at least 5000 and still more preferably at least 6000 (and in laboratory verification a cell can demonstrate in excess of 7000 cycles) with the afore mentioned preferred discharge capacity, before significant (e.g. greater than 30%) deterioration.

The invention will now be described in more detail, without limitation, with reference to the accompanying Figures.

In FIG. 1, a dual electrolyte flow battery system 1 is illustrated, which comprises a cell stack 3 comprising a stack or multiple electrochemical cells 5 (shown in FIG. 3), a catholyte reservoir 7 and flow circulation system 9 including pump 11 for circulating catholyte through the flow circulation system 9 and reservoir 7 and through the cathode half cell 19 (see FIG. 3) of each cell 5 and an anolyte reservoir 13 and flow circulation system 15 including pump 17 for circulating anolyte through the flow circulation system 15 and reservoir 13 and through the anode half cell 21 (see FIG. 3) of a cell 5. Current is captured (during discharge) and delivered (during charge) to the electrochemical cells 5 via current collectors 23,25 (see FIG. 3) and imported or exported via a two-way power convertor 27. Thus, when there is surplus energy on the electricity grid or from a renewable energy device, for example, the flow battery may be charged whereby current via the power convertor is delivered to the system via current collectors 23,25 causing charge carriers (in this case lithium ions) in the catholyte in the cathode half cell 19 to migrate to the anode half cell 21. Charge is stored in the electrolyte solutions. During discharge, a load is applied to the power convertor 27 which draws current from current collectors 23,25 and charge carrier species (lithium ions) migrate from the anode half cell 21 to the cathode half cell 19. The catholyte 29 in the system 1 is preferably lithium polysulfide system in a carrier medium such as THF. The anolyte 31 in the system is preferably a lithium solvated electronic solution (Li-SES) of lithium complexed with polycyclic hydrocarbons such as naphthalene in a solvent such as THF.

Figure 2:
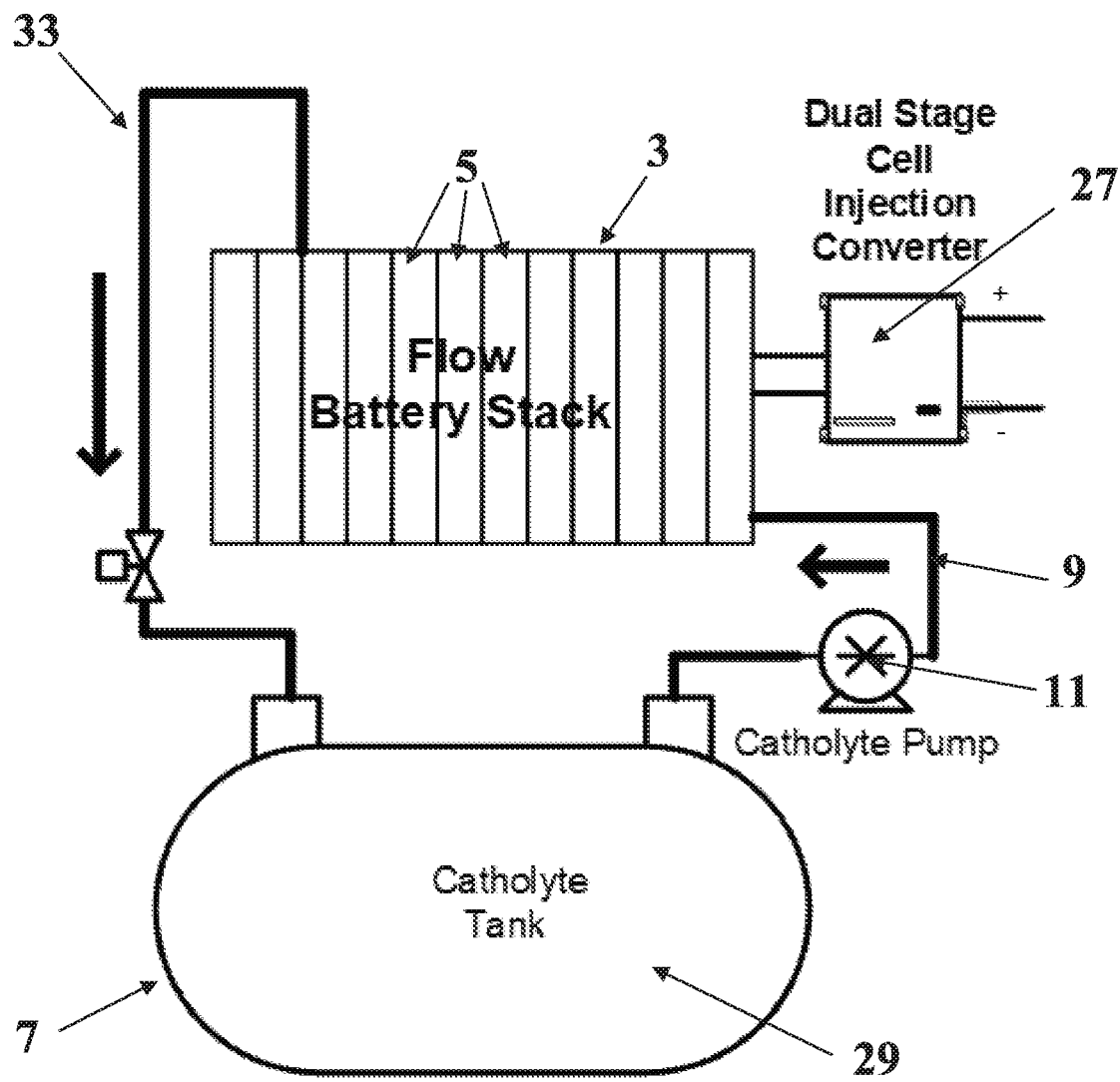
FIG. 2 is a diagrammatic representation of a flow battery according to another embodiment of an aspect of the invention having a catholyte and solid anode.
Figure 3:
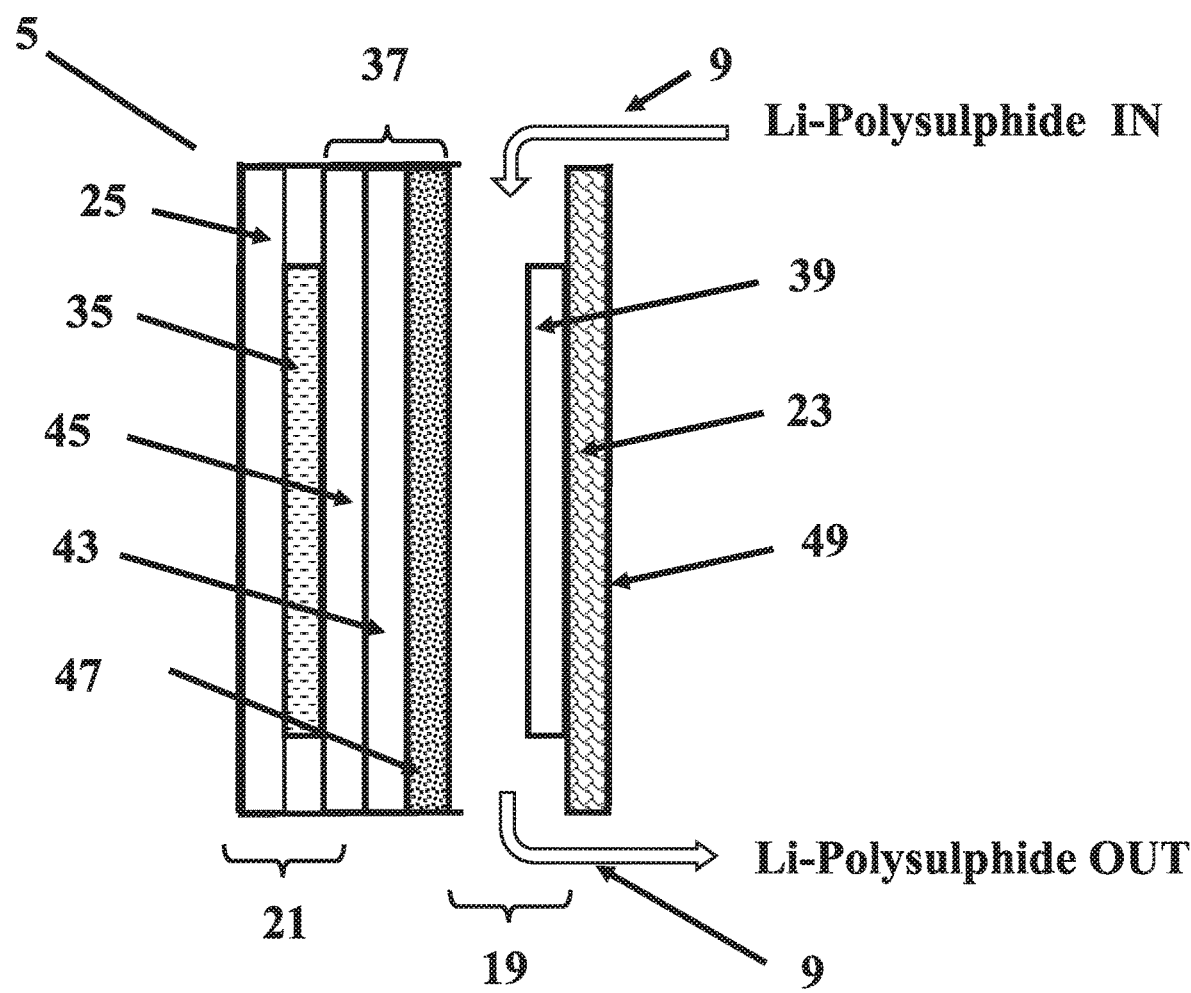
FIG. 3 is a diagrammatic representation of an electrochemical cell of an aspect of the invention having an ion selective separator of the invention.

In FIG. 2, a hybrid flow battery system 33 has a single electrolyte (catholyte 29) and a solid anode (see FIG. 3). The battery 33 comprises a cell stack 3 comprising a stack or multiple electrochemical cells 5 (see FIG. 3), a catholyte reservoir 7 and flow circulation system 9 including pump 11 for circulating catholyte through the flow circulation system 9 and reservoir 7 and through the cathode half cell 19 (see FIG. 3) of each cell 5. The anode half-cell 21 (see FIG. 3) comprises a solid anode 35 of intercalated graphite hosting lithium as a charge carrier (see FIG. 3) and so no liquid anolyte or anolyte tank etc. Current is captured (during discharge) and delivered (during charge) to the electrochemical cells 5 via current collectors 23,25 (see FIG. 3) and imported or exported via a two-way power convertor 27. Thus, when there is surplus energy on the electricity grid or from a renewable energy device, for example, the flow battery may be charged whereby current via the power convertor is delivered to the system via current collectors 23,25 causing charge carriers (in this case lithium ions) in the catholyte 29 in the cathode half cell 19 to migrate to the anode half cell 21 where it is accepted into the intercalation host graphite anode 35. During discharge, a load is applied to the power convertor 27 which draws current from current collectors 23,25 and charge carrier species (lithium ions) migrate from the anode half cell 21 to the cathode half cell 19. The catholyte 29 in the system 1 is preferably lithium polysulfide system in a carrier medium, which is preferably glycol-based, e.g. tetra(ethylene glycol) dimethyl ether, DMSO and 1,3-dioxolane. The anode 35 is preferably lithium intercalated graphite, a solid anode for hosting lithium ions.

FIG. 3 shows an electrochemical cell 5 used in a preferred embodiment of the invention and, in particular, in a hybrid flow battery of FIG. 2. The electrochemical cell 5 has an anode half-cell 21 and a cathode half-cell 19 separated by an ion selective separator 37. The anode half-cell 21 comprises a solid anode 35 lithium intercalated graphite in a 50 μm coating on a 100 μm stainless steel foil as an anode current collector 25. The cathode half-cell 19 comprises a catholyte 29 of lithium polysulfide in a carrier medium of tetra(ethylene glycol) dimethyl ether, DMSO and 1,3-dioxolane, dosed with phosphorus pentasulfide and lithium nitrate. A cathode current collector 23 of aluminium foil 100 μm has a carbon black film coating 39 of 25 μm thickness on the cathode side of the current collector 23, which is disposed to provide a catholyte space 41 through which catholyte 29 may flow to and from a reservoir 7 via a flow circulation system 9. The ion selective separator 37 comprises a 10 μm microporous polypropylene separator film 43 which allows conduction or migration of lithium ions, an aluminium oxide lithium ion conducting layer 45 coated on the anode side of the film 43 and a 5 μm thick graphene layer 47 formed on the cathode side of the film 43.

During discharge, lithium ions hosted in the intercalated graphite anode 35 migrate or are conducted across the ion selective separator 37 and react with $S_8$ or lithium sulfide species such as $Li_2S_8$, $Li_2S_6$ or $Li_2S_4$ in the catholyte 29 to form more highly lithiated species. The graphene layer 47 helps activate or catalyse reaction of polysulfide species with lithium ions in solution and reduce the risk of polysulfide shuttle (across the separator 37) which would degrade the battery or its performance.

EXAMPLES

Example 1

An electrochemical cell for use in a hybrid flow battery in which the electrochemical cell has a solid anode of lithium intercalated in graphite and a lithium polysulfide based catholyte was prepared.

An anode half-cell electrode slurry was made up using 75% wt coarse graphite powder (CGP) (20 um>CGP particle size>10 um), 8% wt fine graphite powder (FGP) (10 um>FGP particle size>5 um), 2% wt conductive additive super C65, 3% wt graphene nano platelets, 2 wt % $LiNO_3$ and 10% wt binder composition. The binder composition was made up of 20% wt sodium carboxymethyl cellulose (CMC-Na) and 40% wt sodium polyacrylic acid (PAA-Na) dissolved in 40% wt water. The slurry was ball milled for 5 hours and then blade casted on a 100 μm stainless steel foil which is used as the anode current collector. The layer coated foil was dried at vacuum for 12 hours at 90° C. The resulting dried layer coated foil provides the stainless steel current collector and the intercalation graphite anode for the anode half-cell.

A cathode half-cell is prepared using a 100 μm aluminium foil as the current collector which is coated with a carbon black film coating on the cathode side of the in a thickness of 25 μm, the carbon black film coating formed by coating a slurry comprising Ketjenblack™, an electroconductive carbon black available from Akzo Nobel in an amount of 60% by weight, graphene nano platelets in an amount of 30% by weight and 10% polyvinylidene fluoride dissolved in N-methyl-2-pyrrolidone.

The cell was assembled with a separator comprising a 10 μm microporous polypropylene separator film having a 5 μm graphene nanoplatelet layer coated on the cathode side and an aluminium oxide layer coated on the anode side. The cell was sealed and filled with a lithium polysulfide solution $Li_2S_4$ in a carrier medium and sufficient additional lithium added to convert all the polysulfide to its highly lithiated species $Li_2S$ which is effective to cause the excess lithium to occupy the interalated graphite anode in a charge balanced state. The cell was then sealed for use in testing.

Example 2

A solvent system for use as a carrier medium for a lithium polysulfide catholyte in an electrochemical cell of a hybrid flow battery (such as that produced according to Example 1) was explored.

The preferred solvent system was identified as having a flash point of 180° C. and a melting point of no higher than −5° C.

Mixtures of three solvents, TEGDME, DMSO and 1,3-dioxolane, were investigated. Table 1 illustrates the findings for a range of % v/v solvent mixtures.

TABLE 1 solvent system test findings

| Solution Number | Percentage % V/V | | | Flash point >180 C. | Melting point not higher than −5 C. |
|---|---|---|---|---|---|
| | TEGDME | DMSO | DOL | | |
| 1 | 5 | 90 | 5 | Yes | No |
| 2 | 10 | 85 | 5 | Yes | No |
| 3 | 15 | 80 | 5 | Yes | no |
| 4 | 20 | 75 | 5 | Yes | No |
| 5 | 25 | 70 | 5 | Yes | No |
| 6 | 30 | 65 | 5 | Yes | No |
| 7 | 35 | 60 | 5 | Yes | no |
| 8 | 40 | 55 | 5 | Yes | No |
| 9 | 45 | 50 | 5 | Yes | No |
| 10 | 50 | 45 | 5 | Yes | No |
| 11 | 55 | 40 | 5 | Yes | no |
| 12 | 60 | 35 | 5 | Yes | No |
| 13 | 65 | 30 | 5 | Yes | No |
| 14 | 70 | 25 | 5 | Yes | yes |
| 15 | 75 | 20 | 5 | Yes | Yes |
| 16 | 80 | 15 | 5 | Yes | yes |
| 17 | 85 | 10 | 5 | Yes | Yes |
| 18 | 90 | 5 | 5 | Yes | yes |
| 19 | 5 | 85 | 10 | Yes | No |
| 20 | 10 | 80 | 10 | Yes | No |
| 21 | 15 | 75 | 10 | Yes | No |
| 22 | 20 | 70 | 10 | Yes | No |
| 23 | 25 | 65 | 10 | Yes | No |
| 24 | 30 | 60 | 10 | Yes | No |
| 25 | 35 | 55 | 10 | Yes | No |
| 26 | 40 | 50 | 10 | No | No |
| 27 | 45 | 45 | 10 | No | No |
| 28 | 50 | 40 | 10 | No | Yes |
| 29 | 55 | 35 | 10 | Yes | Yes |
| 30 | 60 | 30 | 10 | Yes | Yes |
| 31 | 65 | 25 | 10 | Yes | Yes |
| 32 | 70 | 20 | 10 | Yes | Yes |
| 33 | 75 | 15 | 10 | Yes | Yes |
| 34 | 80 | 10 | 10 | Yes | Yes |
| 35 | 85 | 5 | 10 | Yes | Yes |

As can be seen from Table 1, solvent formulations 14 to 18 and 29 to 35 meet both the defined requirements. Thus, a suitable solvent system includes solvent mixtures of 5% v/v 1,3-dioxolane with from 70-90% v/v TEGDME and 5-25% v/v DMSO and solvent mixtures of 10% v/v 1,3-dioxolane with from 55-85% v/v TEGDME and 5-35% v/v DMSO.

Example 3

An electrochemical cell for a hybrid flow battery was constructed using the method and materials of Example 1 in which a polysulfide catholyte was used. The lithium polysulfide catholyte was prepared using stoichiometric quantities of lithium and sulfur mixed together with a nominal formula of $Li_2S_4$ and stirred in a TEGDME/DMSO/DOL solvent system (70%/25%/5% v/v respectively—an acceptable solvent system according to Example 2) at 80° C. for two days to formulate a 5M sulphur solution. (5 moles of sulfur in a litre). 1 wt % $LiNO_3$, 1 wt % lithium bis(trifluoromethanesulfonyl)imide (LiTFSI), 0.2 wt % Lithium bis(oxalato) borate (LiBOB) and 0.2 wt % $P_2S_5$ were added to the solution and stirred for 3 hours.

The catholyte solution was added to the cell in the manner described in Example 1 and the cell sealed.

The anode and cathode current collectors were connected to an electronic test bed. The cell was charged in a constant current at 30 mA/cm$^2$, which varied from 2.4V-2.8V. Lithium polysulphide species becomes a mixture of dissolved $S_8$ and $Li_2S_8$ and additional lithium gets intercalated in the anode.

Cell testing was started after performing about 20 charge-discharge cycles which intercalate and de-intercalate lithium ions in the anode. The cell was tested for performance in terms of discharge capacity, cycle number without degradation and voltage efficiency.

Figure 4:
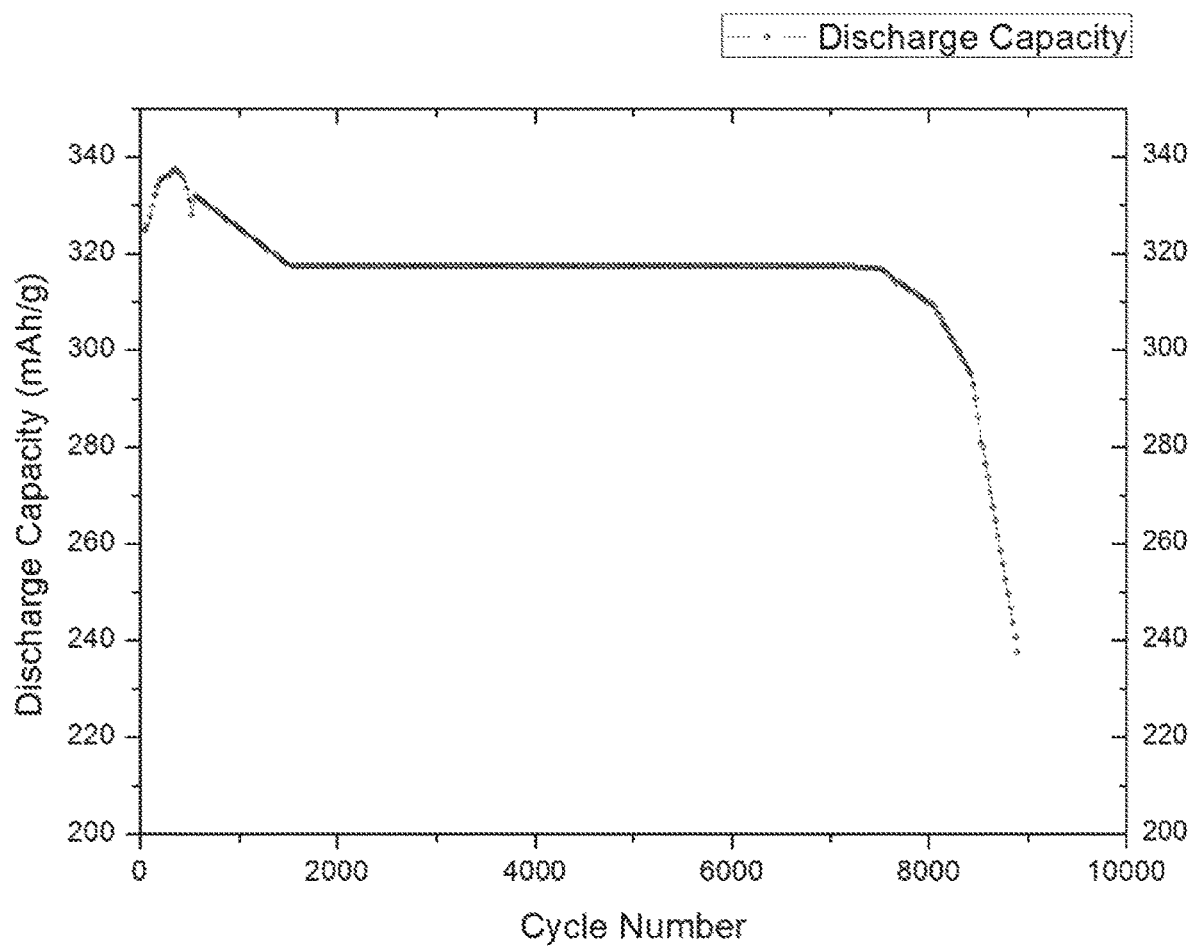
FIG. 4 is a graph of discharge capacity against cycle number for an electrochemical cell according to one embodiment of the invention.
Figure 5:
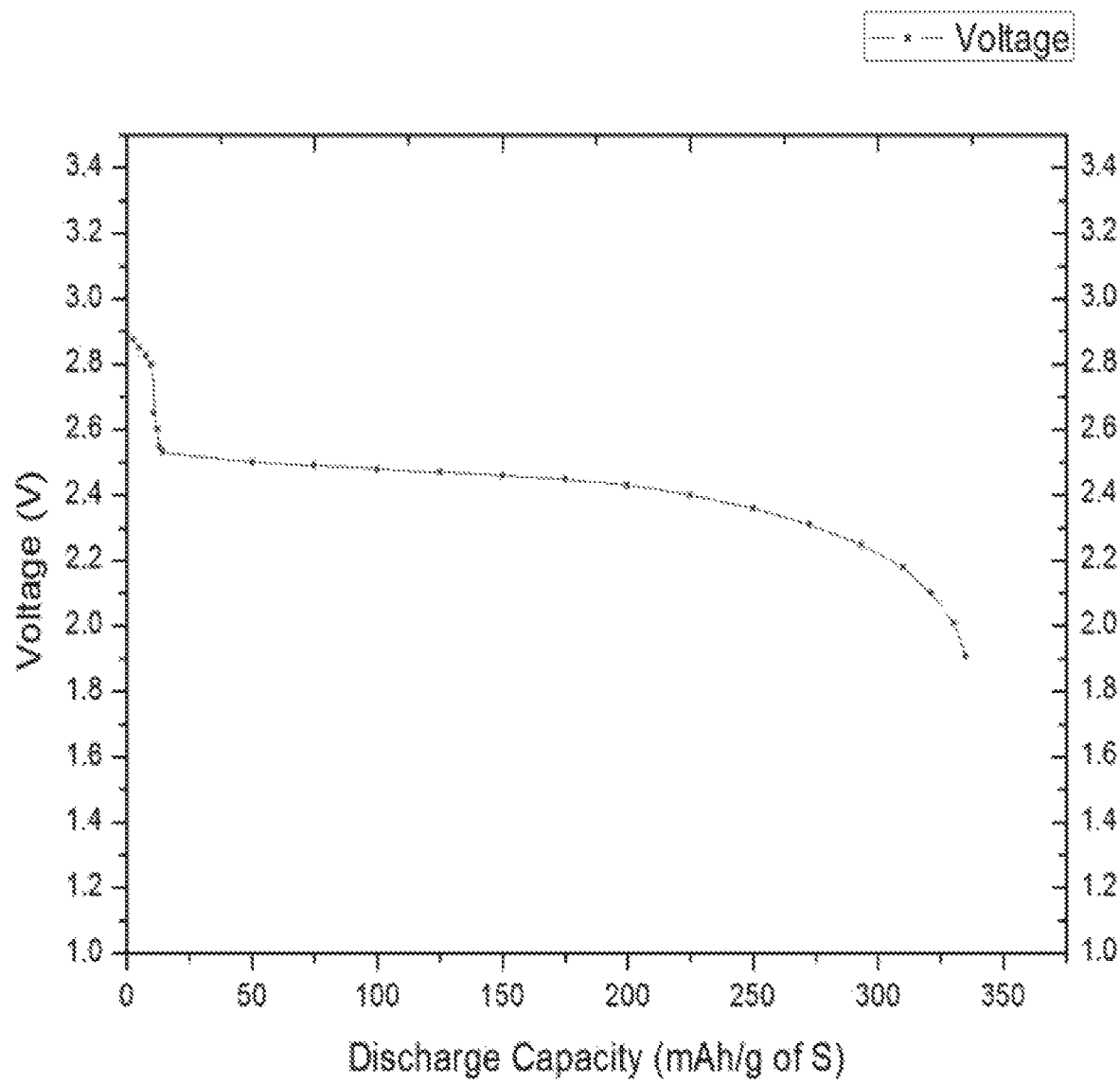
FIG. 5 is a graph of voltage against discharge capacity for an electrochemical cell according to one embodiment of the invention.

FIGS. 4 and 5 show graphs of the test results. FIG. 4 shows a graph of discharge capacity in mAh/g of sulfur versus cycle number. FIG. 5 shows a graph of voltage versus discharge capacity (mAh/g of sulfur).

FIG. 4 shows the number of cycles the battery can achieve against the cell discharge capacity. The cell was discharged to a depth of discharge close to 95%. $LiNO_3$ and $P_2S_5$ were dosed every 250 cycles in very small quantities. (0.1% wt of Sulphur). Pulse flushing was used (as described in the general description) if highly lithiated species were detected (from about 1.9 V).

The cell showed that it has a discharge capacity of about 325 mAh/g of sulfur which when operated at 95% depth of discharge manifested as a discharge capacity of approximately 315 mAh/g of sulfur, which was stable for more than 7000 cycles after which degradation of discharge capacity began and became rapid after 8000 cycles.

The capacity degradation shown is mainly due to the degradation of the lithium intercalation graphite anode.

The use of alkali salts of carboxymethyl cellulose (CMC-Alkali) and polyacrylic acid (PAA-alkali) were used in the production of the anode, which greatly enhanced the performance compared to standard PVDF binder used in graphite intercalation anodes.

In FIG. 4, a graph of discharge capacity vs cell voltage is shown for the cell. Higher voltages correspond to sulfur being converted to higher order lithium polysulfide species such as $Li_2S_8$. Voltage starts to drop during the formation of highly lithiated species (e.g. $Li_2S_2$ and $Li_2S$). The battery control system stopped drawing power after 1.9V. This demonstrates an effective discharge capacity close to 325 mAh/g of sulfur.

The invention has been described with reference to a preferred embodiment. However, it will be appreciated that variations and modifications can be effected by a person of ordinary skill in the art without departing from the scope of the invention.

The invention claimed is:

1. A lithium ion flow battery comprising:
an electrochemical cell comprising an anode half-cell and a cathode half-cell separated by an ion-selective separator, the electrochemical cell having at least one electrolyte and which comprises a lithium polysulfide catholyte;
at least one electrolyte reservoir and a flow circulation system for facilitating flow of the electrolyte to and from the electrochemical cell and electrolyte reservoir; and
a power convertor for two way conversion of current to and from the electrochemical cell and a load or supply, wherein the:
ion-selective separator comprising a lithium ion conducting separator film for separating the anode half-cell and the cathode half-cell, a carbon layer disposed to a cathode side of the film and a lithium ion conductor layer disposed to an anode side of the carbon layer,
the lithium ion flow battery further comprising an electrolyte flushing system for flushing the electrolyte through the electrochemical cell in a short burst or pulse, which system is configured to cause the electrolyte to be circulated at an increased flow rate over a normal flow rate for a pre-determined or determined duration in dependence of a pre-defined trigger so as to inhibit precipitation of a highly lithiated lithium polysulfide species in the electrochemical cell during a discharge cycle,
and wherein the catholyte further comprises a phosphorus pentasulfide in an amount greater than 0 up to 5% by weight of polysulfide in the catholyte.

2. The flow battery according to in claim 1, wherein the catholyte further comprises a solvating additive for the highly lithiated litium polysulfide species.

3. The flow battery according to claim 1, wherein the catholyte further comprises an lithium nitrate.

4. The flow battery according to claim 1, wherein the catholyte comprises a liquid carrier medium selected from one or a mixture of two or more of tetrahydrofuran, dimethyl sulfoxide, dimethyl formamide, 1,3-dioxolane, dimethyl acetamide and tetra(ethylene glycol) dimethyl ether and tetra ethylene glycol dimethyl ether-lithium trifluoromethanesulfonate.

5. The flow battery according to claim 1, which comprises an anode selected from a solid lithium metal, a solid lithium alloy, a solid lithium composition and a lithium based anolyte.

6. The flow battery according to claim 1, wherein an anode comprises a lithium based anolyte.

7. The flow battery according to claim 6, wherein the anolyte comprises a lithium polyaromatic hydrocarbon complex in a liquid carrier medium.

8. The flow battery as claimed in claim 7, wherein the polyaromatic hydrocarbon is selected from one or a mixture of biphenyl and naphthalene.

9. The flow battery according to claim 1, wherein an anode comprises lithium in an intercalation host material selected from carbon, silicon, tin, or cobalt tin titanium.

10. The flow battery according to claim 9, wherein the anode comprises lithium intercalated in graphite.

11. The flow battery according to claim 1, wherein the electrolyte flushing system is configured to cause electrolyte to be circulated at an increased flow rate over a normal flow rate for a pre-determined or determined duration in dependence of a pre-defined trigger which trigger is the detection of no or minimal reduction in voltage in response to a high current draw test.

12. The flow battery according to in claim 11, wherein the high current draw test comprises drawing a high current for a period of up to 20 ms and wherein the electrolyte flushing system is configured to cause electrolyte to be circulated at an increased flow rate for over a normal flow rate up to 10 seconds.

13. The flow battery according to claim 1, wherein the electrolyte flushing system is configured to flush the catholyte during discharge at greater than 75% discharge.

14. The flow battery according to 1, which further comprises a dosing system for use with the catholyte or the anolyte, wherein the dosing system is configured to dose the catholyte or the anolyte with a functional additive.

15. The flow battery according to claim 14, wherein the dosing system is configured to dose the catholyte or the anolyte with a functional additive after pre-determined periods of time, after a pre-determined number of charge-discharge cycles or a pre-determined number of charge-discharge cycles over a pre-determined depth of discharge, in response to a performance measurement outside a pre-determined range and/or to maintain the concentration of the functional additive in the catholyte or the anolyte within a pre-determined range.

16. The flow battery according to claim 14, wherein the dosing system is configured to dose the catholyte with the functional additive and wherein the functional additive is selected from a highly lithiated lithium polysulfide species solvating agent and lithium nitrate.

17. The flow battery according to claim 14, wherein the functional additive is phosphorus pentasulfide which is dosed into the catholyte to maintain the concentration thereof within the range 0.5% to 5% by weight.

18. A flow battery according to claim 1, wherein the carbon layer is a graphene-containing layer.

19. The flow battery according to claim 1, wherein the carbon layer is obtainable by coating a composition of carbon powder, and wherein the carbon powder-containing layer has a thickness of from 1 to 10 μm and is loaded in an amount of 0.01 mg/cm² to 1 g/cm² of the lithium ion conducting separator film.

* * * * *